(12) United States Patent
Goevert et al.

(10) Patent No.: US 8,071,061 B2
(45) Date of Patent: Dec. 6, 2011

(54) CATALYST FOR AN EXHAUST GAS AFTERTREATMENT SYSTEM FOR INTERNAL COMBUSTION ENGINES

(75) Inventors: Michael Goevert, Monheim (DE); Stefan Ebener, Sauerlach/Lochhofen (DE); Thomas Scheerer, Wettstetten (DE); Thomas Krusenbaum, Wettstetten (DE)

(73) Assignee: Alantum Corporation, Sangdaewon-Dong, Joongwon-Gu, Gyonggi-Do, Seongnam (KR)

( * ) Notice: Subject to any disclaimer, the term of this patent is extended or adjusted under 35 U.S.C. 154(b) by 230 days.

(21) Appl. No.: 12/529,575

(22) PCT Filed: Mar. 18, 2008
(Under 37 CFR 1.47)

(86) PCT No.: PCT/EP2008/002169
§ 371 (c)(1),
(2), (4) Date: Nov. 13, 2009

(87) PCT Pub. No.: WO2008/113561
PCT Pub. Date: Sep. 25, 2008

(65) Prior Publication Data
US 2010/0247408 A1    Sep. 30, 2010

(30) Foreign Application Priority Data
Mar. 22, 2007    (DE) .................. 10 2007 013 797

(51) Int. Cl.
*B01D 53/56* (2006.01)
*B01D 11/02* (2006.01)

(52) U.S. Cl. ........... 423/213.2; 502/527.19; 502/527.23; 422/270; 422/276

(58) Field of Classification Search .................. None
See application file for complete search history.

(56) References Cited

U.S. PATENT DOCUMENTS
2,898,202 A    8/1959    Houdry et al.

FOREIGN PATENT DOCUMENTS

| | | |
|---|---|---|
| DE | 1594716 | 11/1969 |
| DE | 31 07 620 | 2/1982 |
| DE | 34 30 398 | 2/1986 |
| DE | 195 09 029 | 12/1995 |
| DE | 195 02 844 | 4/1996 |
| EP | 0 511 415 | 11/1992 |
| EP | 1 348 839 | 10/2003 |
| WO | 2006/007956 | 1/2006 |

*Primary Examiner* — Melvin Mayes
*Assistant Examiner* — Sheng H Davis
(74) *Attorney, Agent, or Firm* — Lexyoume IP Group, PLLC.

(57) ABSTRACT

The invention relates to a device for the catalytic treatment of exhaust gases of motor vehicles which comprises a catalyst substrate designed as a hollow cylinder, an inlet-side and an outlet-side gas baffle and an outer wall, wherein the gas baffles enclose the catalyst substrate and the outlet-side gas baffle and the catalyst substrate form a first cavity into which an exhaust-gas stream can be fed, passing through the catalyst substrate and entering a second cavity which is surrounded by outer wall, gas baffles and catalyst substrate, wherein the outlet-side gas baffle has gas vents, and wherein the recessed part of the outlet-side gas baffle is beaded, with the result that the catalyst substrate is fixed. The invention also relates to a process for the production of the device according to the invention and its use, plus a method for cleaning exhaust gases of motor vehicles.

16 Claims, 2 Drawing Sheets

Figure 1:
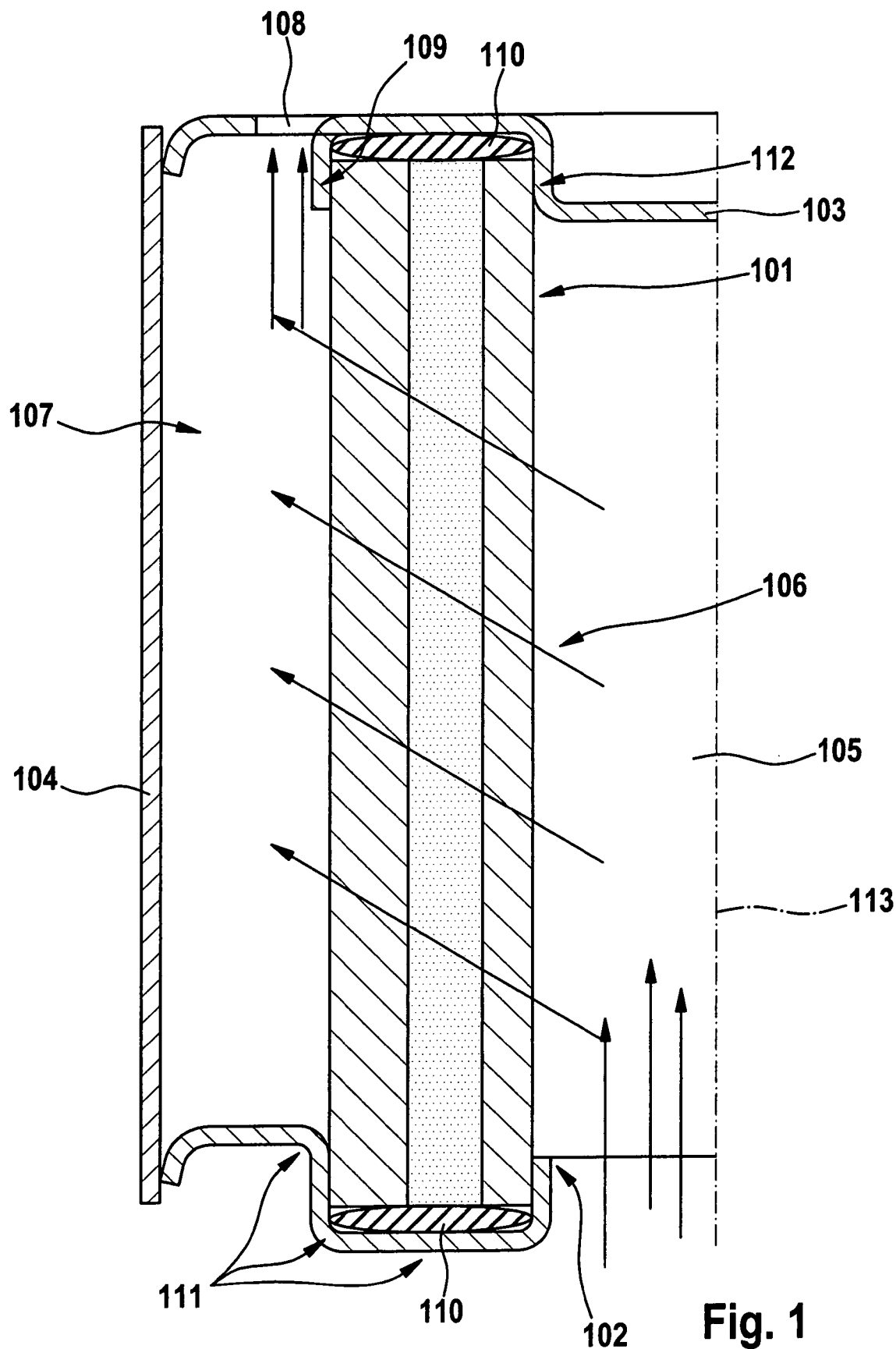

CATALYST FOR AN EXHAUST GAS AFTERTREATMENT SYSTEM FOR INTERNAL COMBUSTION ENGINES

The present invention relates to a device for the catalytic treatment of exhaust gases of motor vehicles, plus a process for the production of the device according to the invention and its use, plus a method for cleaning exhaust gases of motor vehicles.

A vehicle catalyst usually consists of several components. Typically, a temperature-stable honeycomb body made of a ceramic or a metal, generally a so-called monolith, through which a plurality of thin-walled channels pass, serves as a support. The so-called washcoat is located on the support. It consists of a porous material, usually aluminium oxide ($Al_2O_3$), in order to provide a catalyst surface that is as large as possible. The catalytically active noble metals are stored in the washcoat. Often, the aqueous suspension of the coating composition is also called "washcoat". In the exhaust-gas catalysts used today, these are usually the noble metals platinum, rhodium and palladium. The ceramic support is normally mounted in a metal housing, the so-called canning, with the aid of special mats. The canning is fixedly built into the exhaust-gas line of the vehicle and has some further connection possibilities, for example for lambda sensors or thermocouples.

The task of vehicle catalysts is the chemical conversion of the combustion pollutants hydrocarbons, carbon monoxide (CO) and nitrogen oxides ($NO_x$) into carbon dioxide ($CO_2$), water ($H_2O$) and nitrogen ($N_2$) by oxidation or reduction. Depending on the task, there are different types of catalysts. In a three-way catalyst, the oxidation of CO and hydrocarbons and the reduction of $NO_x$ take place parallel to one another. The three-way catalyst can be used only in vehicles with spark ignition engine and lambda control. In a diesel engine, the excess of oxygen in the exhaust gas prevents the reduction of the $NO_x$ and thus makes special catalysts necessary.

In order to reduce the $NO_x$ content in the exhaust gas of diesel engines, intra-engine measures by which the combustion is influenced in a targeted manner can be provided. However, the disadvantages of these measures are an increased soot emission and a reduction in engine performance. Because of clearly lower exhaust-gas temperatures compared with the spark ignition engine, catalysts in diesel engines are often fitted close to the exhaust-gas manifold. The aim of the catalysts in diesel engines is not only the minimization of $NO_x$, but also the oxidation of the soot particles, in order to reduce the emission of fine dust. This type of catalyst is the known diesel oxidation catalysts. These catalysts are normally provided with a washcoat which contains only platinum and/or palladium.

A further type of catalyst is the $NO_x$ storage catalyst. Since modern engines work with an excess of oxygen to increase engine efficiency, conventional catalysts cannot be used. The oxidation of CO and hydrocarbons takes place analogously to the conventional three-way catalyst, but nitrogen oxides must be placed in interim storage. Their catalytic reduction is intermittent with a rich exhaust-gas mixture. If the absorption capacity of the catalyst is used up by nitrogen oxides, a rich, i.e. reductive, exhaust-gas mixture is briefly established, with the result that the nitrogen oxides placed in interim storage in the catalyst are reduced to nitrogen. The catalyst is thereby prepared for the next storage cycle.

A further method, now ready for the market, for the reduction of the nitrogen oxides is the so-called selective catalytic reduction. In this case, an aqueous urea solution is continuously sprayed into the exhaust-gas stream, e.g. by means of a dispensing pump. Water and ammonia form by hydrolysis, wherein the ammonia is able to reduce the nitrogen oxides in the exhaust gas to nitrogen.

With all known catalyst types, the embedding, i.e. placement, of the catalyst substrates poses production engineering problems. Until now, the placement in a housing has been carried out in such a way that the catalyst substrate was firmly clamped in a cylindrical housing with elastic intermediate layers interspersed. During operation, the catalyst substrate and the housing must withstand, without damage, temperature differences of over 1000° C. which are associated with a thermally induced expansion. The life of the catalyst is thereby shortened. In addition, the outlay on the manufacture of a catalyst in which a catalyst substrate is placed with elastic intermediate layers in a cylindrical catalyst housing is very considerable.

DE 15 94 716 A1 discloses an arrangement for the catalytic afterburning of motor vehicle exhaust gases in which a support catalyst is arranged in combination with a ceramic material, wherein metal fibre material and ceramic material are arranged in layers as support catalyst and the catalyst is arranged on the fibre material. The ceramic material is embedded between the metal fibre fleeces and thus the exhaust gas can flow through it.

WO 2006/007956 A1 discloses an exhaust-gas purification device for motor vehicles with a monolith which is arranged in a housing and extends transversely to the central longitudinal axis of the housing and a slit region arranged between the monolith and a section of the housing comprising the same.

Holding elements by which at least the front of the monolith can be fixed to the housing and which extend radially inwards and partially overlap at the front of the monolith are located in the slit region. The bearing mats can thereby be expected to meet less strict requirements in the slit region as regards the holding forces exerted by the bearing mat, with the result that mats serving only to thermally isolate the housing can be used.

DE 34 30 398 A1 discloses a catalytic exhaust-gas purification device in which a sheath is used which, at its end to be welded to the housing, projects over the end-surface of the support matrix in axial direction, and wherein the sheath, an inlet part for the exhaust gas to be cleaned and the jacket of the housing are connected to one another via a common weld seam running in circumferential direction and the sheath is mounted floating. In further known devices, a catalyst substrate is arranged axially in a cylindrical housing (see DE 34 30 398 A1, DE 31 07 620 A1, DE 195 02 844 A1 or DE 195 09 029 A1). A problem with these devices is the costly manufacture comprising many work steps. Furthermore, the catalyst substrate according to the teachings of these published documents is not optimally protected against mechanical and thermal stress.

The object of the invention was therefore to produce a catalyst in which the catalyst substrate is arranged, secure against thermal and mechanical stress, in a housing. Furthermore, the catalyst is to be able to be produced cheaply and in few work steps.

The object is achieved by a device for the catalytic treatment of exhaust gases of motor vehicles which comprises a catalyst substrate designed as a hollow cylinder, an inlet-side and an outlet-side gas baffle and an outer wall, wherein the gas baffles enclose the catalyst substrate and the outlet-side gas baffle and the catalyst substrate form a first cavity into which an exhaust-gas stream can be fed, passing through the catalyst substrate and entering a second cavity which is surrounded by outer wall, gas baffles and catalyst substrate, wherein the outlet-side gas baffle has gas vents, and wherein the part of the outlet-side gas baffle that has been recessed for the gas vents is beaded, with the result that the catalyst substrate is fixed.

The advantage of this device compared with those known from the state of the art lies in particular in a simplified manufacture of the catalyst, i.e. one comprising fewer steps. The catalyst substrate is mounted in the catalyst housing in such a way that fractures caused by thermal or mechanical stress are effectively avoided.

By the term "beading" is meant within the framework of this invention the bending up of the edges of sheets at right angles. A further mechanical distinction is drawn according to the type of shaping: if the sheet is upset when shaped, the term beading is used; if the sheet is stretched, a person skilled in the art also refers to the sweeping procedure. Within the framework of this invention, by beading is generally meant both the upsetting and the stretching of the sheet.

By the recessed part of the outlet-side gas baffle is meant the following: in order to create a gas vent in the outlet-side gas baffle, cuts are made in the sheet. The part of the sheet that is beaded is called the recessed part within the framework of the application. If the cut represents for example half of the circumference of a circle, the semi-circle formed is the recessed part that is beaded.

The recessed part rests in positive-locking manner against the cylinder wall of the catalyst substrate after the beading. Thus the catalyst substrate is fixed using simple manufacturing steps, i.e. held in the interior of the body formed by the outer wall and the gas baffles.

With the aid of this device, an exhaust-gas stream can be treated which is conducted through the inlet-side gas baffle into the first cavity of the device, then passes from there through the catalyst substrate, is conducted into the second cavity of the device and removed, cleaned, from the device through the gas vents.

The treatment of the exhaust-gas stream can optionally also be carried out in the reverse direction of flow. In such a treatment process, the gas stream is conducted through the outlet-side gas vents into the second cavity, the gas stream passes through the catalyst substrate and enters the first cavity of the device and is removed from the device through the inlet-side gas baffle. According to the invention, the claimed device is thus designed in such a way that the exhaust-gas stream is first guided into the second cavity of the device and then through the first cavity of the device.

The device thus provides a catalyst which can be used for each of the catalyst types described in detail above. According to the invention, the device is thus used for a three-way catalyst, a diesel oxidation catalyst, an $NO_x$ storage catalyst or for a catalyst for selective catalytic reduction (SCR catalyst).

In a preferred embodiment, the catalyst substrate is rimmed, by bending the inlet-side gas baffle, with the result that there is a guide in the inlet-side gas baffle into which the catalyst substrate is fitted in positive-locking manner.

By a bend is meant within the framework of this invention a bend in a gas baffle in which a rim or projection of the other part can engage. In the above-described preferred embodiment, the inlet-side gas baffle is bent in such a way that, seen in top view onto the gas baffle, a depression forms into which the catalyst substrate is fitted in positive-locking manner. Alternatively, the gas baffle can also be bent once only, with the result that either the inside or the outside of the catalyst substrate abuts the bend in positive-locking manner.

In a further preferred embodiment, the catalyst substrate is rimmed by bending the outlet-side gas baffle, with the result that the inside of the catalyst substrate designed as a hollow cylinder abuts in positive-locking manner against a bend of the outlet-side gas baffle.

In the described embodiments, the accommodation of catalyst substrate is achieved by shaping the gas baffle. The advantage of these embodiments lies in a more secure fit of the catalyst substrate in the device. In particular with diesel oxidation catalysts for the removal of soot particles, a positive-locking abutment of the catalyst substrate is essentially important in order that the exhaust gas is prevented from flowing past the catalyst substrate. A seal is easier to achieve with these embodiments.

In a preferred embodiment, the catalyst substrate represents a honeycomb body which consists of a metal or a ceramic material and is provided with a washcoat in which the catalytically active materials are embedded.

A wide variety of catalyst substrates are disclosed in the state of the art. There are ceramic materials which are produced by a sintering process and represent a spongy skeleton structure. Metal substrates are produced by winding the substrates. Such production processes are known. If wound substrates are used as catalyst substrates, the substrates can be provided with two or more coating materials. The coatings consist of catalytically active materials which have different porosities, i.e. in which holes in the catalytically active coating materials show a bi- or multimodal size distribution. The advantage of this embodiment is that several functions can be performed by one and the same catalyst substrate, for example different reactions can be catalysed with the catalyst substrate.

According to a further preferred embodiment, in the device according to the invention, a support seal which preferably consists of a wire cloth is arranged between the gas baffles and the catalyst substrate in each case. This wire cloth must withstand the high temperatures in a catalyst. Thus the wire cloth consists of a material such as stainless steel or other metal or non-metal materials with a high resistance to corrosion at high temperatures.

In general, care must be taken that the exhaust gas, in particular in the case of diesel oxidation catalysts, actually flows only through the substrate coated with the catalytic material or the washcoat and does not flow outside past such a substrate. This flowing past of the exhaust gas is a known problem in the technique and is described as the so-called bypass effect. With the aid of the support seals, it is guaranteed that the exhaust gas actually flows through the catalyst substrate.

In a further preferred embodiment, the support seal consists of an elastic material. Through such an elastic accommodation of the catalyst substrate, mechanical stresses can be dampened, whereby the life of the catalyst is increased.

Where the support seal is made of an elastic material, the catalyst material is clamped in the holder by a press fit. In this embodiment, the bypass effect is completely prevented. At the same time, a lesser force is exerted on the holder if there is marked thermal expansion of the catalyst substrate, with the result that tensions resulting from thermal expansion are cushioned. Vibrations during the operation of the motor vehicle are also cushioned and not transmitted to the catalyst substrate.

The invention further comprises a process for the production of a device according to the invention by arranging the catalyst substrate in positive-locking manner between the inlet-side and outlet-side gas baffle, connecting the gas baffles to the outer wall, letting gas vents into the outlet-side gas baffle, wherein a residual part of the outlet-side gas baffle is beaded in order to fix the catalyst substrate. The recessed part of the outlet-side gas baffle firstly serves to fix the catalyst substrate and additionally clears the way for the gas to leave the catalyst.

In an embodiment according to the invention, the gas baffles and the outer wall are connected by welding gas baffles to the outer wall. This is the simplest method, in process engineering terms, of connecting the metal components.

In a further embodiment according to the invention, the gas inlet openings are let into the outlet-side gas baffle by setting each gas inlet opening into the outlet-side gas baffle through a semi-circular cut, wherein the resultant semi-circle is then beaded in order to fix the catalyst substrate. In this process, the catalyst substrate is locked in place in the catalyst housing very few work steps.

According to the invention, any technically known process can be used to set the cut into the outlet-side gas baffle. Particularly preferably, this takes place using a stamping machine, a milling machine or a saw.

In a further preferred embodiment, before the catalyst substrate is arranged between the gas baffles, the support seals are arranged between catalyst substrate and gas baffles.

An embodiment example of the present invention is described in more detail below with reference to the attached drawings without being considered limiting.

Figure 2:
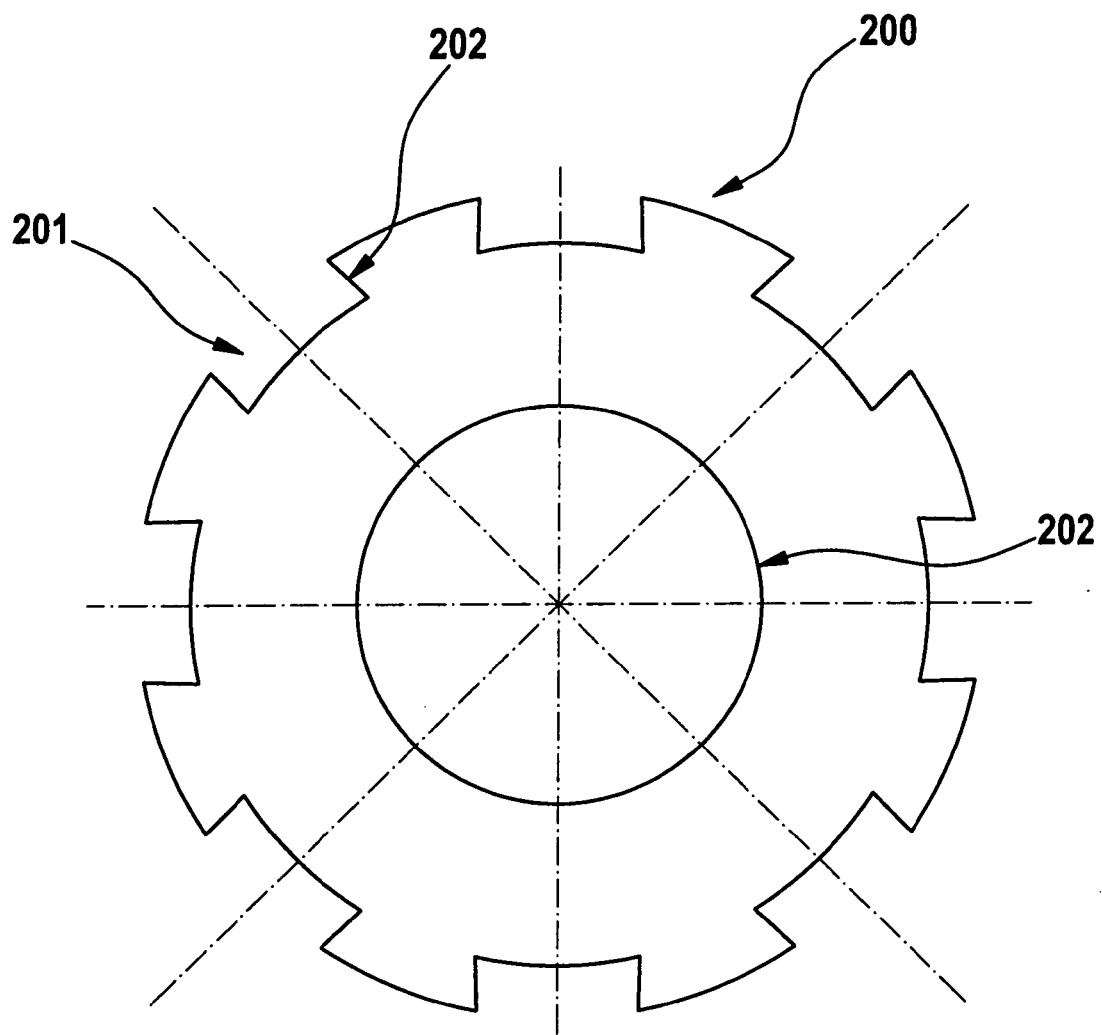

There are shown in:

FIG. 1 a schematic representation of an embodiment of the device according to the invention with a catalyst substrate in a catalyst housing, FIG. 2 the top view of an outlet-side gas baffle.

For the sake of simplicity, FIG. 1 shows only a section through a divided device. The viewer has to imagine the device 100 rotationally symmetrical to the axis 113. The catalyst substrate 101 is arranged between inlet-side gas baffle 102 and outlet-side gas baffle 103. An exhaust-gas stream 106, represented by arrows, enters the first cavity 105 on the inlet side, passes through the catalyst substrate 101 and flows into the second cavity 107. From there, the exhaust-gas stream 106 is conducted through the gas vent 108 which is located in the gas baffle 103. These gas vents are set into the sheet by partially cutting into it and beading the recessed part 109, with the result that the catalyst substrate 101 is fixed. The gas baffles 102 and 103 plus the outer wall 104 form the catalyst housing. FIG. 1 shows an embodiment in which the catalyst substrate 101 is represented in a guide rail 111 which is bent into the sheet. FIG. 1 also shows the support seals 110.

FIG. 2 shows the top view of an outlet-side gas baffle 200 with gas vents 201. In this example, the gas vents 201 have been produced by cutting into the gas baffle 200, with the result that the cut edges 202 form. The residual material, which cannot be shown in the top view, is beaded and forms the recessed part which is given the reference number 109 in FIG. 1.

The invention claimed is:

1. A device for the catalytic treatment of exhaust gases of motor vehicles comprising
a catalyst substrate designed as a hollow cylinder,
an inlet-side gas baffle and an outlet-side gas baffle and an outer wall,
wherein the gas baffles enclose the catalyst substrate and the outlet-side gas baffle and the catalyst substrate form a first cavity into which an exhaust-gas stream can be fed, passing through the catalyst substrate and entering a second cavity which is surrounded by outer wall, gas baffles and catalyst substrate,
wherein the outlet-side gas baffle has a gas vent formed by beading the outlet side gas baffle to form a recessed part and the recessed part rests against the wall of the catalyst substrate to fix the catalyst substrate into the device.

2. The device according to claim 1, in which the catalyst substrate is rimmed by bending the inlet-side gas baffle, with the result that there is a guide in the inlet-side gas baffle into which the catalyst substrate is fitted in positive-locking manner.

3. The device according to claim 1, in which the catalyst substrate is rimmed by bending the outlet-side gas baffle, with the result that the inside of the catalyst substrate designed as a hollow cylinder abuts in positive-locking manner against a bend of the outlet-side gas baffle.

4. The device according to claim 1, in which the catalyst substrate represents a honeycomb body made of a metal or a ceramic material which is provided with a washcoat.

5. The device according to claim 1, in which the catalyst substrate is a wound catalyst substrate.

6. The device according to claim 5, in which the wound catalyst substrate is provided with two or more coating materials, wherein the coating materials used have different porosities.

7. The device according to claim 1, in which a support seal is arranged in each case between the gas baffles and the catalyst substrate.

8. The device according to claim 7, in which the support seal comprises a ring of wire cloth.

9. The device according to claim 7, in which the support seal consists of an elastic material.

10. A process for the production of a device according to claim 1, comprising
arranging the catalyst substrate in positive-locking manner between the inlet-side gas baffle and outlet-side gas baffle,
connecting the gas baffles to the outer wall,
cutting gas vents into the outlet-side gas baffle,
wherein the recessed part of the outlet-side gas baffle is beaded in order to fix the catalyst substrate.

11. The process according to claim 10, in which gas baffles and outer wall are connected by welding gas baffles to the outer wall.

12. The process according to claim 10, in which the gas inlet openings are let into the outlet-side gas baffle by setting each gas inlet opening into the outlet-side gas baffle through a semi-circular cut, wherein the resultant semi-circle is then beaded in order to fix the catalyst substrate.

13. The process according to claim 12, in which the cut is set by a stamping machine, a milling machine or a saw.

14. The process according to claim 10, in which, before the catalyst substrate is arranged between the gas baffles, support seals are arranged between catalyst substrate and gas baffles.

15. A method for the treatment of exhaust gases of motor vehicles using a device according to claim 1, in which an exhaust-gas stream is conducted through the inlet-side gas baffle into the first cavity of the device, from where it passes through the catalyst substrate, is conducted into the second cavity of the device and removed from the device through the gas vent.

16. The method according to claim 15, in which the method is carried out in the reverse direction of flow.

* * * * *